United States Patent [19]

Guha

[11] Patent Number: 5,175,723
[45] Date of Patent: Dec. 29, 1992

[54] DIRECT DRIVE MECHANISM FOR DATA PICKUP CARRIAGE WITH NO DIRECT ATTACHMENT BETWEEN MOTOR AND FRAME

[75] Inventor: Dwipendra N. Guha, Calcutta, India

[73] Assignee: Avnet, Inc., Great Neck, N.Y.

[21] Appl. No.: 541,807

[22] Filed: Jun. 20, 1990

[51] Int. Cl.⁵ .................... G11B 17/00; H02K 5/00
[52] U.S. Cl. .................... 369/215; 369/244; 310/91
[58] Field of Search ............... 369/215, 219, 244, 258; 360/104, 105, 106; 248/673; 310/71, 91

[56] References Cited

U.S. PATENT DOCUMENTS

| | | | |
|---|---|---|---|
| 4,003,059 | 1/1977 | Sugiura et al. | 369/223 X |
| 4,442,516 | 4/1984 | Funabashi | 369/219 X |
| 4,473,899 | 9/1984 | Miki et al. | 369/219 X |
| 4,825,432 | 4/1989 | Takahashi | 369/219 X |
| 4,831,615 | 5/1989 | Goto et al. | 369/223 |

FOREIGN PATENT DOCUMENTS

| | | | |
|---|---|---|---|
| 352351 | 4/1922 | Fed. Rep. of Germany | 310/91 |
| 59-52435 | 3/1984 | Japan | 369/215 |
| 60-191479 | 9/1985 | Japan | 369/219 |
| 61-287081 | 12/1986 | Japan | 369/215 |
| 62-92180 | 4/1987 | Japan | 369/215 |
| 1-54771 | 3/1989 | Japan | 369/215 |
| 1-224981 | 9/1989 | Japan | 369/215 |
| 2217094 | 10/1989 | United Kingdom | 369/219 |

*Primary Examiner*—John W. Shepperd
*Assistant Examiner*—Edward Sikorski
*Attorney, Agent, or Firm*—Darby & Darby

[57] ABSTRACT

The present invention is directed to a compact disc pickup drive mechanism which eliminates any alignment problems between a drive screw, a drive motor and a supporting frame. The drive mechanism comprises a drive screw having one end rotationally secured to a portion of the supporting frame. The drive screw engages a threaded portion of the pickup carriage so that rotation of the drive screw moves the carriage linearly with respect to the frame. The other end of the drive screw is directly coupled to the shaft of the motor. The shaft of the motor is rotatably supported in the frame. The housing of the motor is not directly connected to the frame so that the drive screw will automatically align with respect to the frame.

5 Claims, 1 Drawing Sheet

DIRECT DRIVE MECHANISM FOR DATA PICKUP CARRIAGE WITH NO DIRECT ATTACHMENT BETWEEN MOTOR AND FRAME

BACKGROUND OF THE INVENTION

This invention relates to a compact disc pickup drive mechanism and, more particularly, to a direct drive mechanism having a mounting system which helps to avoid problems due to misalignment of the motor and driving mechanism.

A compact disc player receives audio information in the form of digital data stored in a spiral fashion on an optical disc. A laser pickup is used to "read" the information on the disc and transmit it to circuitry which translates this data into an audio signal. The laser pickup travels parallel to the disc along a radial path. The position of the pickup along the face of the disc dictates what information is being "read." The speed and location of the pickup should be precise to insure that the appropriate information is being read at the proper time.

Two different compact disc pickup linear drive systems are commonly used. The first is a rack and pinion drive, wherein a rack affixed to a laser pickup is moved by a motor driven pinion. A rack and pinion drive system responds to the rotation of a series of gears, each of which introduces an error or delay.

The second type of linear drive mechanism is a screw and nut system. Here, the laser pickup is attached to a nut which is driven by a screw turned by a motor. The screw and nut drive is preferable because the number of parts between the motor and the pickup is reduced to one, the screw. Also, the screw and nut system is more accurate because error introduced by each gear is minimized. The absence of gears improves the reliability of tracking because the pickup moves in direct response to the motor without the introduction of positioning error (backlash) from a gear drive system. The screw and nut drive system provides a smoother and more consistent drive load.

Backlash is an inherent problem with any gear drive system. Backlash is caused by the clearance provided between the engaged teeth of two gears. The clearance provides smooth engagement of the gears, but also introduces a positioning error of one gear with respect to the other. The backlash between two gears creates a delayed rotational displacement of one in response to a driven rotational displacement of the other. One disadvantage of having the problem of backlash in a drive gear system for the pick-up carriage of a compact disc player is that the pick-up may continue to move a small (yet appreciable) amount after the drive motor stops thereby misplacing the pickup and affecting the operation of the cd unit. The positioning error may be detected by the microprocessor of the unit which would cause the motor to reverse the pick-up carriage and correct for the error. The correct position would eventually be reached but only after reversing the motor at least once. If, because of the backlash of the gear drives, it becomes necessary to correct the position of the pickup for every position request, it is likely that the useful life of the motor will be reduced considerably. Also, such repeated reversals of the motor may cause the microprocessor to shut down the entire unit, reducing its apparent quality and operative performance.

Systems where the drive motor is directly connected to the screw are disclosed in U.S. Pat. No. 4,825,432 to Takahashi and U.S. Pat. No. 4,003,059 to Sugiura et al.

Placing a motor in a direct drive configuration with the drive screw improves response time between the signal reception by the drive motor and the motion of the laser pickup. This is because the pickup responds to the rotation of the screw, which is directly coupled with the motor.

Although the screw and nut drive system is preferable to the rack and pinion drive, its practical use has been limited. In order for a direct drive system to work reliably, the pickup must start and stop at precise predetermined locations and the screw must turn at a uniform speed. The first requirement is met if the motor reacts instantaneously to the application or removal of power; the second requirement is met if the power required to turn the screw is uniform at all positions of the screw. The uniform power requirement necessitates precise alignment. Otherwise, misalignment will cause an uneven load on the motor, causing the screw to slow down or speed up at various points in its rotation. However, it is not economically feasible to adjust the alignment of each individual product when produced in huge quantities. Accordingly, the prior art would commonly align the shafts with a flexible coupling. The coupling is flexible to accommodate misalignment between the affixed motor and the affixed drive screw. However, the flexible coupling is unsuitable for a laser pickup direct drive system because it adds a changing, flexing load when the shaft is a misaligned. This will cause the motor to experience changing load patterns as the shaft rotates which, in turn, reduces the drive speed at some positions and increases it at others.

SUMMARY OF THE INVENTION

The present invention is directed to a compact disc pickup drive mechanism which eliminates drive screw misalignment problems. The drive mechanism comprises a drive screw rotatable in a bearing secured to a frame. The drive screw is in threaded engagement with a nut secured to the pickup carriage so that the carriage moves linearly with respect to the frame when the drive screw rotates. The drive screw is directly coupled at one end to the drive shaft of the motor thereby assuring proper alignment of the motor drive shaft and drive screw. Because the motor is not attached to the frame, strain on the bearings due to misalignment is reduced. This tends to prevent undesired increases in friction and torque which would hamper smooth movement of the pickup.

DESCRIPTION OF THE PREFERRED EMBODIMENTS

Figure 1:
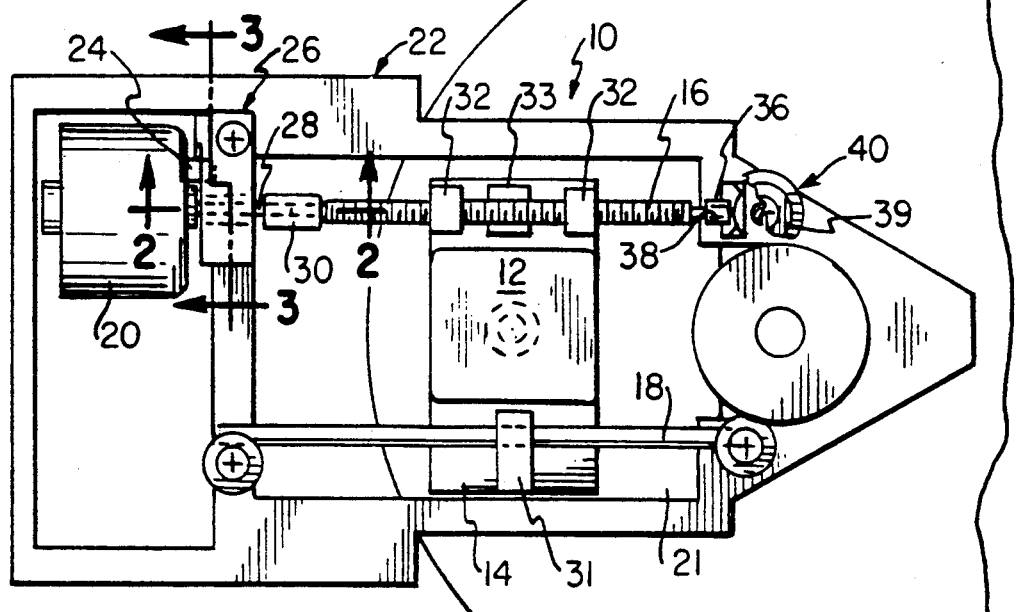
FIG. 1 is a top view of one embodiment of a compact disc pickup drive mechanism in accordance with the present invention.

FIG. 1 shows a compact disc pickup drive mechanism in accordance with the present invention. The mechanism 10 comprises a laser pickup 12 mounted on a carriage 14, a drive screw 16, a parallel supporting rod 18, a motor 20 and a frame 22.

The frame 22 is generally rectangular with a central gap 21. The laser pickup 12, drive screw 16, and parallel support rod 18 are located within this gap 21. A pin 24 extends from the motor 20 and is loosely held in place by a bracket 26 which supports the pin from above and below, thus preventing the motor 20 from spinning. A drive shaft 28 extends from the motor 20, through the frame 22 and terminates in a rigid coupler 30 where it is coupled in direct axial alignment with the drive screw 16. The motor 20 turns the drive shaft 28 and the drive screw 16.

The carriage 14 has a carriage guide 31 which slidably engages the parallel support rod 18 with the carriage 14. Two guide bushings 32 engage the drive screw 16 with the carriage 14. A threaded drive nut 33 also engages the drive screw 16 with the carriage and moves the carriage 14 and laser pickup 12 along the drive screw 16 and parallel support rod 18 in response to the rotation of the drive screw 16. It is also possible for the drive shaft 28 and drive screw 16 to be one integral piece, thereby eliminating the need for the rigid coupler 30.

Figure 2:
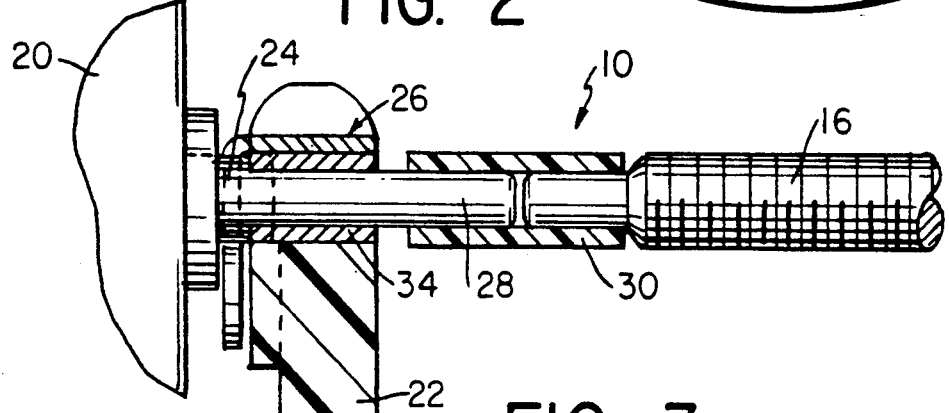
FIG. 2 is a cross-sectional view taken along line 2—2 of FIG. 1.
Figure 3:
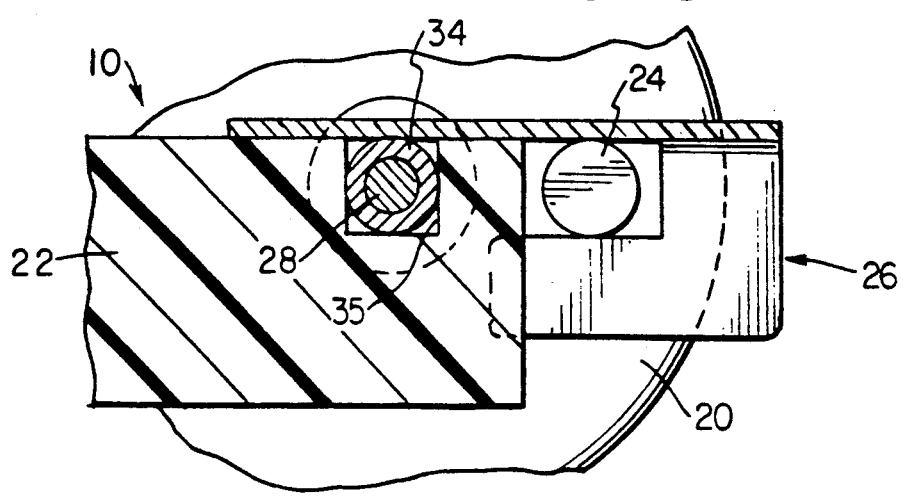
FIG. 3 is a partial cross-sectional view taken along line 3—3 of FIG. 1.

FIGS. 2 and 3 show the connection between the motor 20 and the drive screw 16. The motor 20 is not affixed to the frame 22. The drive shaft 28 extends through a gap 35 (see FIG. 3) in the frame 22. A bushing 34 is situated between the frame 22 and the drive shaft 28. The bushing 34 is slightly thinner than the width of the gap 35, allowing the bushing 34 to have a slight degree of free movement. The bracket 26 covers the gap 35 to hold the bushing 34 in place to facilitate rotation. The drive shaft 28 then enters a rigid, one-piece coupler 30. This coupler 30 may be made of any suitable material, however, a plastics material is preferable. The coupler 30 axially aligns the drive shaft 28 with the drive screw 16. The drive screw 16 terminates within a second bushing 36 which allows the drive screw 16 to be rotatably affixed to the frame 22. The second bushing 36 is fit into a second gap 38 in the frame 22. The second bushing 36 is slightly thinner than the width of the second gap 38, allowing the second bushing to have a slight degree of free movement. Inside the second gap 38 is a spring washer 39 which exerts tension on the end of the drive screw 16. This eliminates any end-play in the drive screw 16 and drive shaft 28. The cavity is covered by a washer 40 to hold the second bushing 36 and the drive screw 16 in place. The washer 40 is held in place by a screw (not numbered).

The alignment problem is avoided by the way the drive shaft 28 and drive screw 16 are affixed to the frame with the motor 20 being free of direct attachment to the frame. The bushings 34 and 36 support to the motor shaft 28 and the drive screw 16, respectively. The motor shaft 28 and the drive screw 16 are properly aligned by the rigid coupler 30. The entire assembly is inserted into the gaps 35, 38, which provide a slight degree of free movement, and covered with the bracket 26 and washer 40. The motor 20 is not rigidly affixed to the frame 22 but is prevented from angular displacement by a pin 24 extending from the motor 20 which is loosely held in place by the bracket 26. This arrangement provides for the proper alignment of the pickup drive mechanism even in large quantity production.

The invention has been particularly shown and described with reference to preferred embodiments thereof. It will be understood by those skilled in the art that various changes in form and details may be made without departing from the spirit and scope of the invention.

What is claimed is:

1. Apparatus for driving a data pickup carriage comprising:
    a frame;
    a drive screw rotatably supported in said frame in at least one location and in threaded engagement with said pickup carriage whereby the pickup carriage moves in response to rotation of said drive screw;
    a motor for rotating said drive screw; said motor being free of direct attachment to said frame;
    a drive shaft extending from said motor and being rotatable by said motor, said drive shaft and drive screw being co-axial;
    bearing means mounted on said frame for supporting said drive shaft for rotation relative to said frame;
    means for preventing angular displacement of said motor relative to said frame during operation of said motor; and
    means for directly coupling together said drive shaft and drive screw.

2. Apparatus for driving a data pickup carriage according to claim 1, wherein said coupling means comprises a rigid one piece sleeve.

3. Apparatus for driving a data pickup carriage according to claim 2, wherein said means for preventing comprises a pin attached to said motor or said frame and abuting against a stop in the other of said motor or said frame.

4. Apparatus for driving a data pickup carriage according to claim 1, further including second bearing means for supporting said drive screw at a position remote from said means for directly coupling.

5. Apparatus for driving a data pickup carriage according to claim 4, wherein said first and second bearing means are loosely positioned within respective gaps in said frame.

* * * * *